(12) United States Patent
Koshiba

(10) Patent No.: US 9,007,517 B2
(45) Date of Patent: Apr. 14, 2015

(54) IMAGING MODULE

(75) Inventor: Yasushi Koshiba, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/126,355

(22) PCT Filed: Jun. 14, 2012

(86) PCT No.: PCT/JP2012/065261
§ 371 (c)(1),
(2), (4) Date: Dec. 13, 2013

(87) PCT Pub. No.: WO2012/173197
PCT Pub. Date: Dec. 20, 2012

(65) Prior Publication Data
US 2014/0118612 A1 May 1, 2014

(30) Foreign Application Priority Data

Jun. 14, 2011 (JP) .................. 2011-132067

(51) Int. Cl.
H04N 5/238 (2006.01)
H04N 9/12 (2006.01)
H04N 5/225 (2006.01)
F16B 12/00 (2006.01)
G02B 7/02 (2006.01)
G03B 17/02 (2006.01)
B60R 11/04 (2006.01)

(52) U.S. Cl.
CPC .............. *H04N 5/2252* (2013.01); *B60R 11/04* (2013.01); *G02B 7/02* (2013.01); *H04N 5/2257* (2013.01); *G03B 17/02* (2013.01); *G02B 7/026* (2013.01)

(58) Field of Classification Search
USPC ................... 348/370, 383, 340, 373; 312/111
See application file for complete search history.

(56) References Cited

U.S. PATENT DOCUMENTS 6,683,654 B1   1/2004 Haijima
2012/0025678 A1* 2/2012 Morishima et al. ........... 312/111

FOREIGN PATENT DOCUMENTS

| JP | 03-092194 U | 9/1991 |
| JP | H03-92194 U | 9/1991 |
| JP | 06-072856 U | 10/1994 |
| JP | 2003-161870 A | 6/2003 |
| JP | 2010-199647 A | 9/2010 |
| WO | 2010/095627 A1 | 8/2010 |

OTHER PUBLICATIONS

International Search Report; PCT/JP2012/065261; Jul. 10, 2012.
The extended European search report issued by the European Patent Office on Nov. 14, 2014, which corresponds to European Patent Application No. 12800633.5-1560 and is related to U.S. Appl. No. 14/126,355.

* cited by examiner

*Primary Examiner* — Joel Fosselman
(74) *Attorney, Agent, or Firm* — Studebaker & Brackett PC

(57) ABSTRACT

An imaging module is provided with: a front case, in which a lens unit is mounted on a side of the subject to be imaged; a back case, which is attached to the front case and seals an imaging substrate in an inside space formed with the front case; and a bracket attached to the back case, and the back case is attached to the front case by case a case fastening screw that is screwed into a screw hole and a case screw-fastening through-hole, and the positioning protrusion 5a is inserted into the case screw-fastening through-hole, so that the back case is positioned on the bracket.

6 Claims, 3 Drawing Sheets

IMAGING MODULE

TECHNICAL FIELD

The present invention relates to an imaging module using an imaging element configured by a semiconductor image sensor and the like.

BACKGROUND ART

A background imaging module having a bracket for attaching to a vehicle and the like has a following configuration, for example.

The imaging module includes a front case, in which a lens unit is mounted to a side facing a subject to be imaged and an imaging substrate having an imaging element mounted thereon is provided to an opposite side part to the side facing the subject to be imaged while the imaging element is being opposed to the lens unit, a back case, which is attached to the front case and seals the imaging substrate in an inside space formed with the front case, and a bracket, which is attached to the back case.

In the such background imaging module having the above configuration, the front case and the back case are screwed and attached by a first screw, the back case and the bracket are screwed and attached by a second screw, and a positioning projection and a hole are formed for high positioning precision. The first screw, the second screw and the positioning projection are separately arranged, respectively.

CITATION LIST

Patent Literature

Patent Document 1: Japanese Utility Model Application Publication No. H6-72856

SUMMARY OF THE INVENTION

Problems to be Solved

According to the background imaging module, the front case and the back case are screwed and attached by the first screw, the back case and the bracket are screwed and attached by the second screw, which is screwed to a screw part separate from the first screw, and the positioning structure is additionally arranged. As a result, the fastening part is enlarged and the imaging module is also enlarged.

On the other hand, when the positioning structure is omitted so as to reduce a size of the fastening part, positions of the cases and the bracket are not uniquely determined, so that an optical axis deviates and an image quality is thus deteriorated.

Accordingly, the present invention has been made keeping in mind the above situations and an object of the present invention is to reduce a size of an imaging module while reducing a size of a fastening part that attaches a front case, a back case, and a bracket and securing high positioning precision so as to obtain a high precision image by suppressing optical axis deviation when the bracket is fastened to an automobile and the like.

Means for Solving the Problem

In order to achieve the above object, an imaging module of the present invention includes: a front case, in which a lens unit is mounted to a side facing a subject to be imaged and an imaging substrate having an imaging element mounted thereon is provided to an opposite side part to the side facing the subject to be imaged while the imaging element is being opposed to the lens unit; a back case, which is attached to the front case and seals the imaging substrate in an inside space formed with the front case; and a bracket, which is for attaching to an external portion and is attached to the back case, a screw hole is formed on the front case, a case screw-fastening through-hole is formed on the back case, a positioning protrusion against the back case is formed on the bracket, the back case is attached to the front case by a case fastening screw that is screwed into the screw hole and the case screw-fastening through-hole, and the positioning protrusion is inserted into the case screw-fastening through-hole so that the back case is positioned on the bracket.

Additionally, in the imaging module of the present invention having the above configuration, an the case fastening screw may have a main body part having a thread and a head part having a diameter larger than the main body part, and the positioning protrusion may have a cylinder shape having a diameter larger than the diameter of the head part of the case fastening screw.

Additionally, in the imaging module of the present invention having the above configuration, a plurality of sets of the case screw-fastening through-hole and the positioning protrusion may provided Additionally, the imaging module of the present invention having the above configuration may include a plurality of the case screw-fastening through-holes, a bracket screw-fastening through-hole may be formed in the bracket to correspondence to at least one of the case screw-fastening through-holes, and the bracket may be attached to the back case by a bracket fastening screw, which is screwed into the case screw-fastening through-hole and the bracket screw-fastening through-hole and has a diameter larger than the case fastening screw.

Additionally, in the imaging module of the present invention having the above configuration, each of the case fastening screw and the bracket fastening screw has a main body part having a thread and a head part having a diameter larger than the main body part, and the diameter of the main body part of the bracket fastening screw may be larger than the diameter of the head part of the case fastening screw.

Additionally, in the imaging module of the present invention having the above configuration, the main body part of the bracket fastening screw may be longer than that of the case fastening screw.

Effects of the Invention

An imaging module of the present invention includes: a front case, in which a lens unit is mounted to a side facing a subject to be imaged and an imaging substrate having an imaging element mounted thereon is provided to an opposite side part to the side facing the subject to be imaged while the imaging element is being opposed to the lens unit; a back case, which is attached to the front case and seals the imaging substrate in an inside space formed with the front case; and a bracket, which is for attaching to an external portion and is attached to the back case, a screw hole is formed on the front case, a case screw-fastening through-hole is formed on the back case, a positioning protrusion against the back case is formed on the bracket, the back case is attached to the front case by a case fastening screw that is screwed into the screw hole and the case screw-fastening through-hole, and the positioning protrusion is inserted into the case screw-fastening through-hole so that the back case is positioned on the bracket. Therefore, it is possible to coaxially arrange a screw-fastening structure and a positioning structure, so that it is possible to considerably reduce a size of the imaging module. Also, according to the high positioning precision, it is possible to suppress optical axis deviation and to obtain a high precision image.

Additionally, since the positioning protrusion is formed to a cylinder shape and a diameter thereof is larger than the diameter of the head part of the case fastening screw, even when the diameter of the head part of the case fastening screw is reduced to enable the case fastening screw to be smoothly inserted into the screw through-hole, a play is reduced in a state where the positioning protrusion part is inserted into the case screw-fastening through-hole, so that it is possible to position the bracket and the back case with high precision.

Additionally, since a plurality of sets of the case screw-fastening through-hole and the positioning protrusion is provided, it is possible to perform the positioning with higher precision.

Additionally, a plurality of the case screw-fastening through-holes is provided, a bracket screw-fastening through-hole is formed in the bracket to correspondence to at least one of the case screw-fastening through-holes, and the bracket is attached to the back case by a bracket fastening screw, which is screwed into the case screw-fastening through-hole and the bracket screw-fastening through-hole and has a diameter larger than the case fastening screw. Thereby, it is possible to securely fix a positional relation of the back case and the bracket positioned with good precision.

Additionally, since the diameter the bracket fastening screw is larger than the diameter of the case fastening screw, it is possible to solidly attach the back case and the bracket. As a result, it is possible to reduce an influence of a stress, which is caused due to the screwing applied to the bracket attached to an external automobile and the like by the screws, on the back case. Therefore, it is possible to suppress the change in an optical axis length between the lens unit and the imaging element or the optical axis deviation, thereby obtaining an image of a high image quality.

Additionally, in the imaging module of the present invention having the above configuration, in case that each of the case fastening screw and the bracket fastening screw has a main body part having a thread and a head part having a diameter larger than the main body part and the diameter of the main body part of the bracket fastening screw is larger than the diameter of the head part of the case fastening screw, it is possible to easily screw the case fastening screw into the screw hole and the case fastening-screw through-hole through the bracket fastening-screw through-hole. Also, it is possible to solidly attach the back case and the bracket and to reduce the influence of the stress, which is caused due to the screwing applied to the bracket attached to the external automobile and the like by the screws, on the back case. Therefore, it is possible to further suppress the change in an optical axis length between the lens unit and the imaging element or the optical axis deviation.

Additionally, in the imaging module of the present invention having the above configuration, in case that the main body part of the bracket fastening screw is longer than that of the case fastening screw, it is possible to solidly attach the back case and the bracket and to reduce the influence of the stress, which is caused due to the screwing applied to the bracket attached to the external automobile and the like by the screws, on the back case. Therefore, it is possible to further suppress the change in an optical axis length between the lens unit and the imaging element or the optical axis deviation.

PREFERRED ILLUSTRATIVE EMBODIMENTS OF THE INVENTION

Hereinafter, an illustrative embodiment of the imaging module of the present invention will be specifically described with reference to the drawings.

Figure 1:
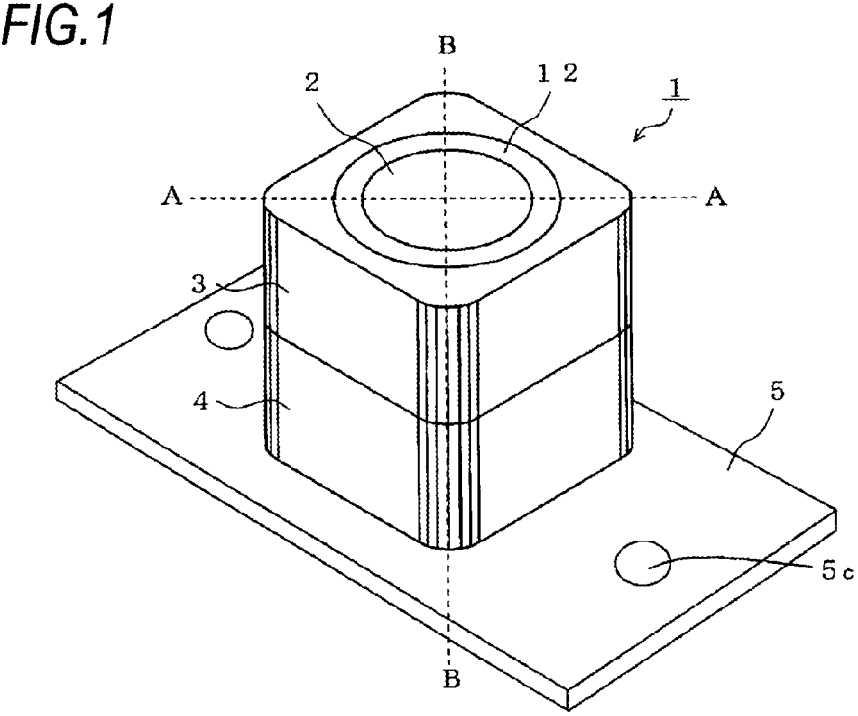
FIG. 1 is a perspective view of a basic configuration showing an example of an illustrative embodiment of the imaging module of the present invention.
Figure 2:
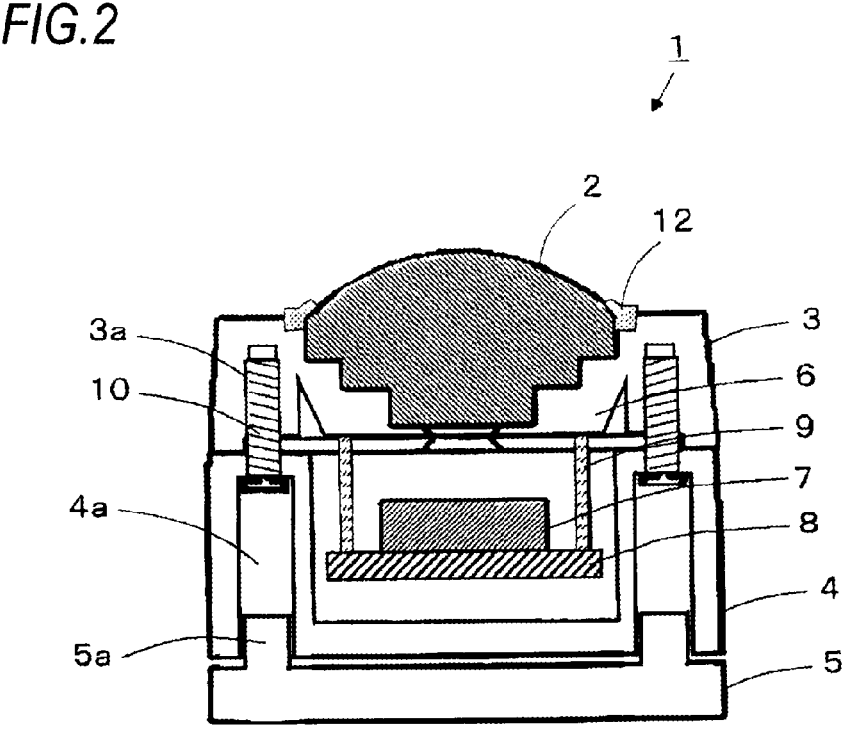
FIG. 2 is a longitudinal sectional view taken along a line A-A of the imaging module shown in FIG. 1.

FIGS. 1 and 2 show an example of the illustrative embodiment of the imaging module of the present invention. FIG. 1 is a perspective view of a basic configuration of the imaging module, and FIG. 2 is a longitudinal sectional view taken along a line A-A of FIG. 1.

An imaging module 1 of this illustrative embodiment includes a front case 3, in which a lens unit 2 is mounted to a side facing a subject to be imaged and an imaging substrate 8 having an imaging element 7 mounted thereon is provided to an opposite side part to the side facing the subject to be imaged while the imaging element 7 is being opposed to the lens unit 2, a back case 4, which is attached to the front case 3 and seals the imaging substrate 8 in an inside space formed with the front case 3, and a bracket 5, which is for attaching to an external portion, attached to the back case 4. The front case 3 is formed with screw holes 3a, the back case 4 is formed with case screw-fastening through-holes 4a, and the bracket 5 is formed with positioning protrusions 5a, respectively. The back case 4 is attached to the front case 3 by case fastening screws 10 that are screwed into the screw holes 3a and the case screw-fastening through-holes 4a. The positioning protrusions 5a, each of which has a diameter larger than a head part of the case fastening screw 10, are inserted into the case screw-fastening through-holes 4a, so that the back case 4 is positioned on the bracket 5.

According to the above configuration, the case fastening screws 10 and the positioning protrusions 5a can be coaxially arranged, and areas occupied by the screw part attaching the front case 3 and the back case 4 and the positioning part positioning the back case 4 on the bracket 5 are made to overlap and to be reduced, so that the size of the imaging module 1 can be reduced.

Although the case fastening screws 10 and the positioning protrusions 5a are coaxially arranged, a strict coaxial-arrangement is not necessarily, and the axes of the case fastening screws 10 and the positioning protrusions 5a may slightly deviate. For example, the axes of the case fastening screws 10 and the positioning protrusions 5a may deviate by about 2 mm or smaller.

Additionally, it is preferable to provide a plurality of sets of the case screw-fastening through-hole 4a and the positioning protrusion 5a. In this case, when the front case 3, the back case 4 and the bracket 5 are attached, it is possible to perform the attachment with high precision while further suppressing a deviation of a position at which the lens unit 2 and the imaging element 7 are attached to the bracket 5.

Figure 3:
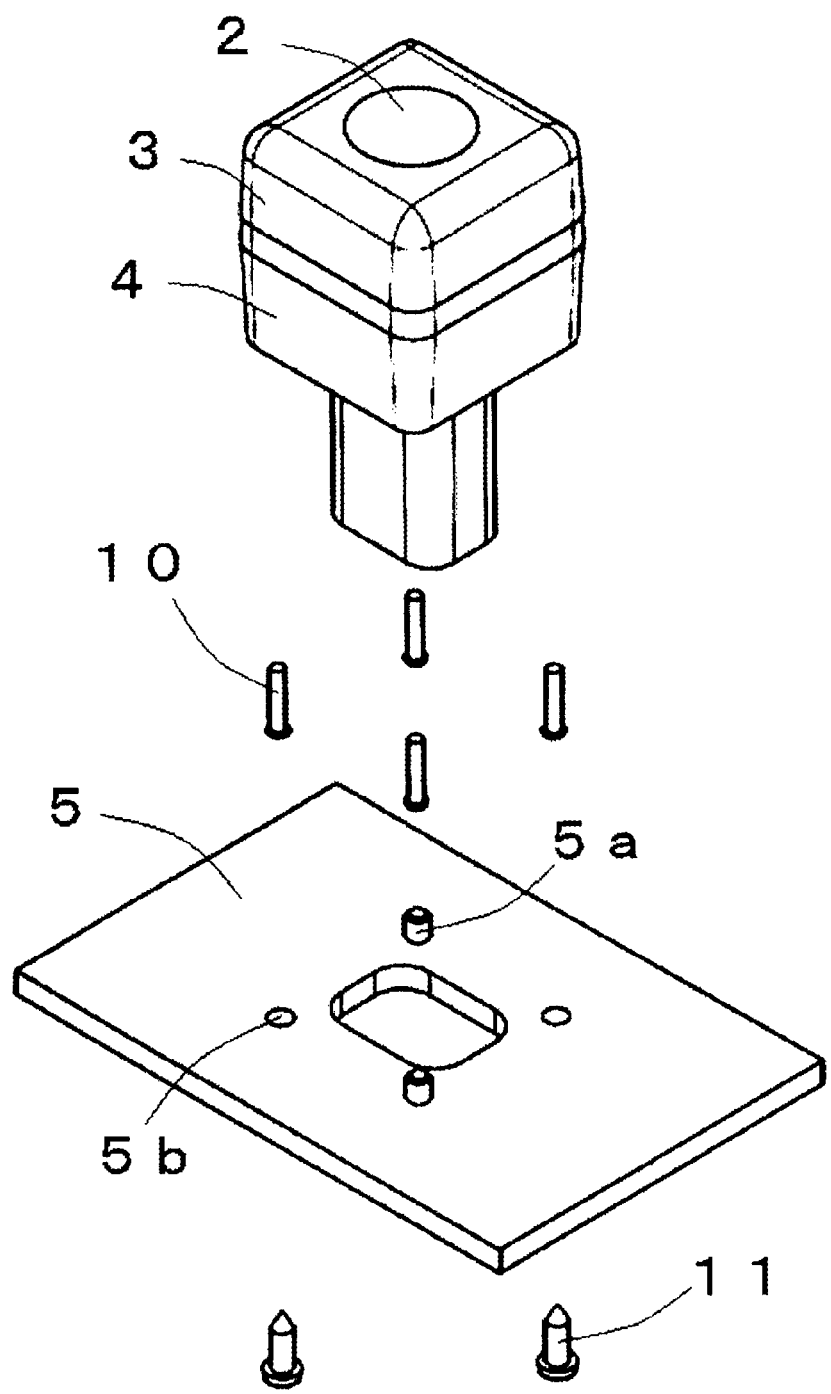
FIG. 3 is a perspective view of a configuration showing an example of an illustrative embodiment of the imaging module of the present invention.
Figure 4:
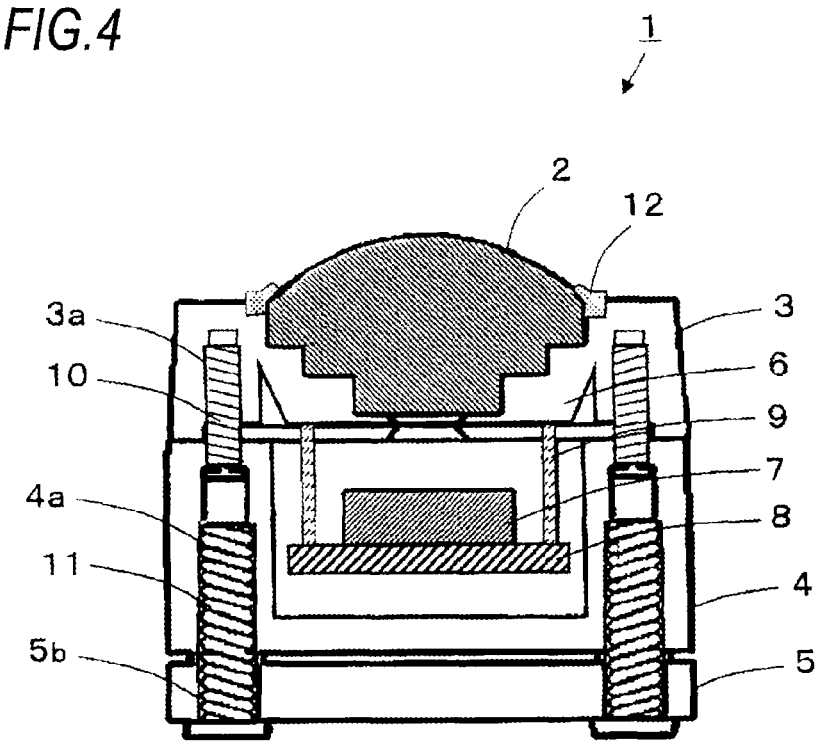
FIG. 4 is a longitudinal sectional view taken along a line B-B of the imaging module shown in FIG. 1.

Additionally, the case screw-fastening through-holes 4*a* are provided in plural and, as shown in FIG. 3, the bracket 5 may be formed with bracket screw-fastening through-holes 5*b* instead of the positioning protrusions 5*a* with corresponding to at least one of the case screw-fastening through-holes 4*a*. Then, as shown in FIG. 2 that is a longitudinal sectional view taken along a line B-B of FIG. 1, the back case 4 is attached to the front case 3 by the case fastening screws 10, which are screwed into the screw holes 3*a* and the case screw-fastening through-holes 4*a*, and the bracket 5 is attached to the back case 4 by bracket fastening screws 11, which have a diameter larger than the case fastening screw 10 and which are screwed into the case screw-fastening through-holes 4*a* and the bracket screw-fastening through-holes 5*b*.

Figure 5:
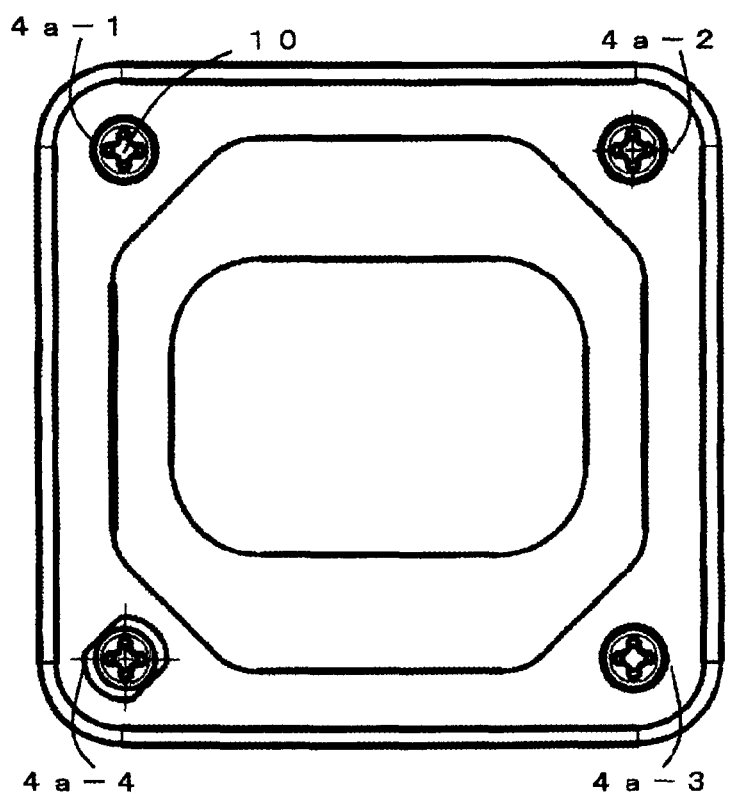
FIG. 5 is a bottom view of a case of the imaging module of the present invention.

Furthermore, as shown in FIG. 5, the case screw-fastening through-holes 4*a* may include a hole having a long or elliptical shape, other than a circular shape, or having a larger diameter. In the example of FIG. 5, the case screw-fastening through-holes 4*a*-2 and 4*a*-4 of four of the case screw-fastening through-holes 4*a* are used for positioning with respect to the bracket 5, and the case screw-fastening through-holes 4*a*-1 and 4*a*-3 are used for fastening to the bracket 5. In the diameter of the case screw-fastening through-hole 4*a*, as a play relative to the diameter of the positioning protrusion 5*a* is set to less, the high attaching precision can be expected. However, an interval of the case screw-fastening through-holes 4*a*-2 and 4*a*-4 and an interval of the corresponding positioning protrusions 5*a* may be mismatched due to molding non-uniformity of the back case 4 and the bracket 5. Even in this case, since any one (4*a*-2) of the case screw-fastening through-holes 4*a* is configured so that the play relative to the diameter of the positioning protrusion 5*a* is set to less and the other (4*a*-4) has the long or elliptical opening or to have a larger diameter, it is possible to somewhat allow the size non-uniformity of the back case 4 and the bracket 5.

Additionally, as the positioning protrusions 5*a* are formed so that the interval therebetween is large, it is possible to improve the positioning precision. Also, as the bracket screw-fastening through-holes 5*b* are formed so that the interval therebetween is large, it is possible to secure a stability of the attachment. Thus, as shown in FIG. 5, they are diagonally arranged, respectively, so that it is possible to achieve the above while securing the longest intervals and to expect the compatibility of the precision and the strength.

According to the above configuration, it is possible to fix a positional relation of the back case 4 and the bracket 5 positioned with high precision by the case fastening screws 10 and the positioning protrusions 5*a*, and also it is possible to reduce the size of the imaging module 1 by coaxially arranging the case fastening screws 10 and the bracket fastening screws 11.

Additionally, since the bracket fastening screw 11 has the larger diameter than the case fastening screw 10, the fastening force for attaching by the bracket fastening screw 11 is larger than that by the case fastening screw 10. As a result, in case that four of the case fastening screws 10 are used, if two of the case screw-fastening through-holes 4*a* of the case fastening screws 10 are used for positioning by the positioning protrusions 5*a* and the other two of the case screw-fastening through-holes 4*a* of the case fastening screws 10 are used for the bracket fastening screws 11, the sufficient attaching strength is obtained. Therefore, it is possible to rigidly attach the bracket 5 to the back case 4 while obtaining the positioning with good precision. Also, since it is possible to reduce the number of the bracket fastening screws 11 to be used, it is possible to make the imaging module 1 light.

Additionally, since the bracket fastening screw 11 has the larger diameter than the case fastening screw 10, it is possible to rigidly attach the back case 4 and the bracket 5. As a result, it is possible to reduce an influence of the stress, which is caused due to the screwing applied to the bracket 5 that is attached to an automobile and the like in outside by the screws, on the back case 4. Therefore, it is possible to suppress the change in an optical axis length between the lens unit 2 and the imaging element 7 or the optical axis deviation, thereby obtaining an image of a high image quality.

Additionally, since the case fastening screws 10 are not seen from the side of the front case 3 facing the subject to be imaged before attaching of the bracket 5 and it are not seen from the outside after attaching of the bracket 5, an aesthetic appearance of the outward shape is not deteriorate.

Although the case fastening screws 10 and the bracket fastening screws 11 are coaxially arranged, a strict coaxial-arrangement is not necessarily, and the axes of the case fastening screws 10 and the bracket fastening screws 11 may slightly deviate. For example, the axes of the case fastening screws 10 and the bracket fastening screws 11 may deviate by about 2 mm or smaller. According to setting within the range, it is possible to obtain the above described effects.

In case that the bracket fastening screw 11 has the larger diameter than the case fastening screw 10, it is preferable that a diameter of a main body part having the threads of the bracket fastening screw 11 is set to be 1.5 to 3 times larger than that of a main body part of the case fastening screw 10. According to setting within the range, it is possible to suppress the change in the optical axis length between the lens unit 2 and the imaging element 7 or the optical axis deviation and to suppress the screw part from being enlarged.

Additionally, it is preferable to provide a plurality of sets of the case fastening screw 10 and the bracket fastening screw 11. In this case, when the front case 3, the back case 4 and the bracket 5 are attached, it is possible to attach while further suppressing the change in the optical axis length between the lens unit 2 and the imaging element 7 or the optical axis deviation.

Additionally, when a plurality of sets of the case fastening screw 10 and the bracket fastening screw 11 is provided, it is preferable that the screwing rotating directions are made to be different. In this case, the strains by the stress, which is caused due to the screwing, are cancelled, so that it is possible to suppress the front case 3, the back case 4 and the bracket 5 from being deformed due to the strains.

The above imaging module 1 is used for vehicle mounting, for example, has a function of imaging a white lane on the road or a blind area of a driver driving a vehicle and is controlled by an ECU (Electronic Control Unit) that controls traveling of the vehicle. Incidentally, an electric signal that is output from the imaging module 1 is converted into an image signal by the ECU and is displayed on a display mounted at the front of a driver seat, for example.

The imaging element 7 is a semiconductor image sensor element such as a CCD image sensor or a CMOS image sensor.

The lens unit 2 has a function of condensing the light from the subject to be imaged to the imaging element 7 and is configured by a lens group configured by a first lens of which a front surface-side has a convex shape so as to condense the light at a wide angle, a second lens for making the light having passed through the first lens close to a parallel light beam and a third lens. In case that the lens unit 2 includes the three lenses, the first lens, the second lens and the third lens are arranged in that order from the front surface-side (the side facing the subject to be imaged, the upper side in FIG. 2) so that they overlap in the optical axis direction. Incidentally, the lens unit 2 may have four or more lenses.

The case mounts and supports the lens unit 2 that is positioned at the front surface-side. The case is divided into the front case 3 and the back case 4, which are integrally attached and configured. The front case 3 has an annular retainer 12, which is arranged at the front surface-side and presses the first lens of the lens unit 2 towards a backside (an opposite side to the side facing the subject to be imaged) as a press member, and a lens barrel 6, which has substantially cylindrical shape and is arranged at the backside of the retainer 12 as a lens holder. The second lens and the third lens are fixed to the lens barrel 6 of the front case 3, and the first lens is fixed with pressing to the lens barrel 6 by the retainer 12.

The retainer 12 and the lens barrel 6 are prepared by a following method, for example.

The lens barrel 6 can be formed by an injection molding method of preparing a mold for injection molding having a cavity, which is formed to match the shape of the lens barrel 6, and injecting, solidifying and molding a raw material for the lens barrel 6 in the cavity, so that a predetermined shape is formed. In the same manner, the retainer 12 can be formed by preparing a mold for injection molding having a cavity, which is formed to match the shape of the retainer 12, and injecting, solidifying and molding a raw material for the retainer 12 in the cavity, a predetermined shape is formed. The retainer 12 and the lens barrel 6 are made of an insulating resin such as polycarbonate (PC), polyphthalamide (PPA) and the like so as to reduce a weight thereof. Incidentally, it is preferable to use the same material for both the retainer 12 and the lens barrel 6 so as to match the thermal expansion/thermal shrinkage.

Additionally, the imaging substrate 8 is attached on the backside of the imaging module 1. The imaging element 7 accommodated in a package made of ceramics, resin and the like is mounted on a principal face of the front surface-side of the imaging substrate 8.

Attachment of the imaging element 7 to the case is made by mounting the imaging element 7 on the principal face of the front surface-side of the imaging substrate 8 and attaching the imaging substrate 8 to the front case 3 via connection terminals 9 and soldering.

The imaging substrate 8 is configured by a printed circuit board that is formed by impregnating an epoxy resin into glass fiber or adding glass fillers to an epoxy resin. In the surface or an inside of the imaging substrate 8, a wiring conductor, which electrically connects the imaging element 7 to be mounted with the terminals of the other different components and fixes the same, and a ground wiring for earth. The wiring conductor and the ground wiring are formed on the surface of or the inside of the printed circuit board by using a method of forming an electrically conductive metal such as copper and gold by a plating method, a method of adhering a metal foil formed into a wiring pattern shape in advance, a method of removing an unnecessary part from a substrate having a metal foil adhered on an entire surface thereof by etching, and the like.

The imaging substrate 8 is formed by preparing a copper-clad substrate having copper foils adhered on the front and back entire surfaces, which is commercially available, cutting the copper-clad substrate into a desired size, and etching the copper foils adhered on the surfaces into desired wiring patterns by an acid solution such as dilute hydrochloric acid. Incidentally, it may be possible that the substrate is formed with through-holes by using a laser or drill and the through-holes are filled with metal paste to make through-conductors so that the wiring patterns on the front and back surfaces of the substrate are electrically connected.

A principal face of the backside of the imaging substrate 8 may be mounted with components such as an IC (not shown) for processing electric signals from the imaging element 7 and a connector (not shown) for connecting cables (not shown) electrically connecting the wiring conductors of the imaging substrate 8 and the ECU.

The back case 4 can be also formed by using the injection molding method, like the front case 3. That is, a mold for injection molding having a cavity, which is formed to match the shape of the back case 4, is prepared and a raw material for the back case 4 is injected, solidified and molded in the cavity, thereby forming a predetermined shape.

The front case 3 and the back case 4 may be also made of metal such as stainless steel, aluminum, brass (copper-zinc alloy) and the like. In this case, it is possible to effectively radiate heat, which is generated from the imaging module, from the front case 3 and the back case 4 to the outside through the case fastening screws 10, the bracket fastening screws 11 and the bracket 5.

The bracket 5 is a plate-shaped protrusion part for attaching the imaging module 1 to an machine, apparatus and the like such as an automobile, and has through-holes 5c for attaching to the external machine, apparatus and the like by screws. The shape of the bracket 5 is not limited to the plate shape and may be a shape having a sidewall part for protecting the case, for example, a dish shape, a box shape and the like. Also, the bracket 5 is made of the resin such as polycarbonate (PC), polyphthalamide (PPA) and the like, the metal such as stainless steel, copper and aluminum, and the like.

Additionally, in the imaging module 1 of this illustrative embodiment, the back case 4 accommodates therein the imaging substrate 8 having the imaging element 7 positioned relative to the lens unit 2. In this case, it is possible to protect the positioned imaging substrate 8 by the back case 4 and to reduce the size of the case configured by the front case 3 and the back case 4. Also, the inside space of the case consists of only the inside of the back case 4, so that the inside space of the case can be made small.

Additionally, in the imaging module 1 of this illustrative embodiment, each of the case fastening screw 10 and the bracket fastening screw 11 has the main body having the threads and the head part having the larger diameter than the main body part. It is preferable that the diameter of the main body part of the bracket fastening screw 11 is larger than the diameter of the head part of the case fastening screw 10.

According to the above configuration, the case fastening screw 10 is easily screwed into the screw hole 3a and the case screw-fastening through-hole 4a through the bracket screw-fastening through-hole 5a. Also, it is possible to attach the back case 4 and the bracket 5 more solidly and to further reduce the influence of the stress, which is caused due to the screwing applied to the bracket 5 attached to the external automobile and the like by the screws, on the back case 4. Therefore, it is possible to further suppress the change in the optical axis length between the lens unit 2 and the imaging element 7 or the optical axis deviation.

In this case, it is preferable that the diameter of the main body part of the bracket fastening screw 11 is set to be larger than and two times or less than the diameter of the head part of the case fastening screw 10. According to setting within the range, it is possible to suppress the change in the optical axis length between the lens unit 2 and the imaging element 7 or the optical axis deviation and also to suppress the screw part from being enlarged.

Additionally, in the imaging module of this illustrative embodiment, it is preferable that the main body part of the bracket fastening screw 11 is longer than that of the case fastening screw 10.

According to the above configuration, it is possible to attach the back case 4 and the bracket 5 more solidly and to further reduce the influence of the stress, which is caused due to the screwing applied to the bracket 5 that is attached to the external automobile and the like by the screws, on the back case 4. Therefore, it is possible to further suppress the change in the optical axis length between the lens unit 2 and the imaging element 7 or the optical axis deviation.

In this case, it is preferable that a length of the bracket fastening screw 11 is set to be 1.5 to 3 times longer than that of the case fastening screw 10. According to setting within the range, it is possible to suppress the change in the optical axis length between the lens unit 2 and the imaging element 7 or the optical axis deviation and to also suppress the imaging module 1 from being lengthened in the direction of the screw (the optical direction).

The case fastening screw 10 and the bracket fastening screw 11 may be self-tapping screws. In this case, the material that can be self-tapped (screw-thread cutting by the screw), such as the resin, can be used for the front case 3 and the back case 4 and the front case 3 and the back case 4 can be prepared by the moldable and cheap material.

Embodiments

The embodiment of the imaging module of the present invention is described in the below.

The imaging module of this embodiment having the configuration shown in FIGS. 1 and 2 was prepared as follows. First, the square cylinder-shaped front case 3 made of polycarbonate and molded by the injection molding method and the square box-shaped back case 4 made of polycarbonate and molded by the injection molding method were prepared. The front case 3 had a square-shaped section having a size of 23 mm length and 23 mm width and having 10 mm height, and the back case 4 had a square-shaped section having a size of 23 mm length and 23 mm width and having a height of 13 mm. Also, the front case 3 had the cylindrical lens barrel 6 therein.

Then, the lens unit 2 configured by the three lenses was mounted to the lens barrel 6 in the front case 3, and the lens unit 2 was fixed by the annular retainer 12. Also, the connection terminals 9 provided to the lens barrel 6 in the front case 3 were inserted into the through-holes of the imaging substrate 8 having the imaging element 7 mounted on the principal face thereof facing the subject to be imaged and the connection terminals 9 were bonded to electrode pads around the through-holes by the soldering, so that the imaging substrate 8 was attached to the front case 4.

Then, the front case 3 and the back case 4 were attached by the case fastening screws 10 that were screwed into the screw holes 3a and the case screw-fastening through-holes 4a and the back case 4 and the bracket 5 were attached by the bracket fastening screws 11 each of which was screwed into the case screw-fastening through-hole 4a and the bracket screw-fastening through-hole 5a and had the larger diameter than the case fastening screw 10. Thereby, the imaging substrate 8 was sealed in the inside space formed by the front case 3 and the back case 4.

At this time, the diameter (2.6 mm) of the main body part of the bracket fastening screw 11 was 1.86 times larger than the diameter (1.4 mm) of the main body part of the case fastening screw 10, the diameter of the main body part of the bracket fastening screw 11 was 1.3 times larger than the diameter (2 mm) of the head part of the case fastening screw 10 and the length (6.5 mm) of the bracket fastening screw 11 was 1.625 times longer than the length (4 mm) of the case fastening screw 10.

On the other hand, as a comparative example, an imaging module was formed, in which the front case and the rear case were attached by a first screw and the rear case and the bracket were screwed and attached by a second screw screwed into a screw part separate from the first screw. In this imaging module, the front case has a square-shaped section having a size of 25 mm length and 25 mm width and having 12 mm height, and the back case 4 had a square-shaped section having a size of 25 mm length and 25 mm width and having a height of 19 mm.

Comparing the sizes of the imaging module 1 of the embodiment and the imaging module of the comparative example by the volume ratios, the imaging module 1 of the embodiment is about 0.67 times of the imaging module of the comparative example and is considerably reduced as regards the size.

Additionally, according to the imaging module of the embodiment, since the bracket fastening screw 11 has the larger diameter than that of the case fastening screw 10, it was possible to solidly attach the back case 4 and the bracket 5. As a result, it was possible to suppress the change in the optical axis length between the lens unit 2 and the imaging element 7 or the optical axis deviation, thereby obtaining an image of a high image quality.

Incidentally, the present invention is not limited to the illustrative embodiment and the embodiment and a variety of changes can be made without departing from the gist of the present invention.

For example, in the above illustrative embodiment, the case fastening screw 10 is inserted from the bracket-side. However, the case fastening screw can be also inserted from the lens-side. Also in this configuration, it is possible to obtain the same effects as the above illustrative embodiment.

Although the present invention has been specifically described with reference to the specific illustrative embodiment, it is apparent to one skilled in the art that a variety of changes and modifications can be made without departing from the spirit and scope of the present invention.

The application is based on a Japanese Patent Application No. 2011-132067 filed on Jun. 14, 2011, the contents thereof being incorporated herein by reference.

DESCRIPTION OF THE REFERENCE NUMERALS

1: imaging module
2: lens unit
3: front case
3a: screw hole
4: back case
4a: case screw-fastening through-hole
5: bracket
5a: positioning protrusion
5b: bracket screw-fastening through-hole
5c: through-hole for attaching to the external portion
6: lens barrel
7: imaging element
8: imaging substrate
9: connection terminal
10: case fastening screw
11: bracket fastening screw

The invention claimed is:

1. An imaging module comprising:
a front case, in which a lens unit is mounted to a side facing a subject to be imaged and an imaging substrate having an imaging element mounted thereon is provided to an opposite side part to the side facing the subject to be imaged while the imaging element is being opposed to the lens unit;
a back case, which is attached to the front case and seals the imaging substrate in an inside space formed with the front case; and
a bracket, which is for attaching to an external portion and is attached to the back case,
wherein a screw hole is formed on the front case,
wherein a case screw-fastening through-hole is formed on the back case,
wherein a positioning protrusion against the back case is formed on the bracket,
wherein the back case is attached to the front case by a case fastening screw that is screwed into the screw hole and the case screw-fastening through-hole, and
wherein the positioning protrusion is inserted into the case screw-fastening through-hole so that the back case is positioned on the bracket.

2. The imaging module according to claim 1,
wherein the case fastening screw has a main body part having a thread and a head part having a diameter larger than the main body part, and
wherein the positioning protrusion has a cylinder shape having a diameter larger than the diameter of the head part of the case fastening screw.

3. The imaging module according to claim 1, further comprising
a plurality of sets of the case screw-fastening through-hole and the positioning protrusion.

4. The imaging module according to claim 1, further comprising
a plurality of the case screw-fastening through-holes,
wherein a bracket screw-fastening through-hole is formed in the bracket to correspondence to at least one of the case screw-fastening through-holes, and
wherein the bracket is attached to the back case by a bracket fastening screw, which is screwed into the case screw-fastening through-hole and the bracket screw-fastening through-hole and has a diameter larger than the case fastening screw.

5. The imaging module according to claim 4,
wherein each of the case fastening screw and the bracket fastening screw has a main body part having a thread and a head part having a diameter larger than the main body part, and
wherein the diameter of the main body part of the bracket fastening screw is larger than the diameter of the head part of the case fastening screw.

6. The imaging module according to claim 4,
wherein the main body part of the bracket fastening screw is longer than that of the case fastening screw.

* * * * *